Figure 1:
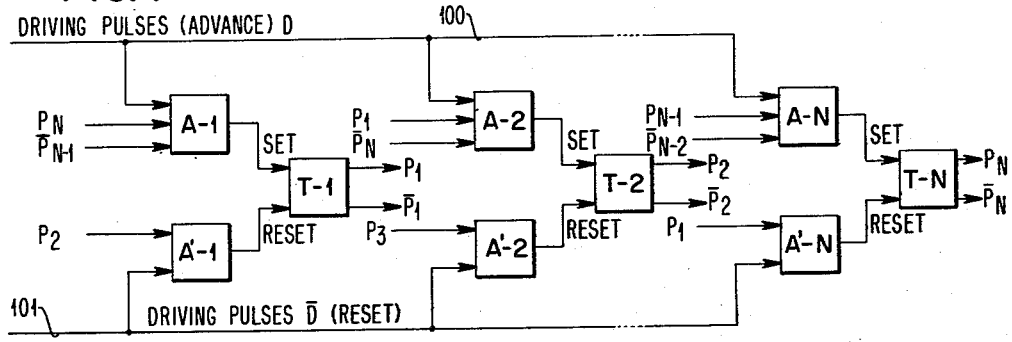

Dec. 29, 1964     L. T. O'CONNOR, JR     3,163,847
CHECK CIRCUIT FOR RINGS WITH OVERLAPPING OUTPUTS
Filed Jan. 3, 1961     2 Sheets-Sheet 1

INVENTOR
LEO T. O'CONNOR JR.

BY Bernard M. Goldman
ATTORNEY

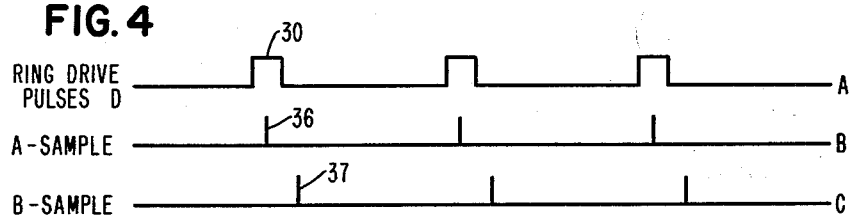
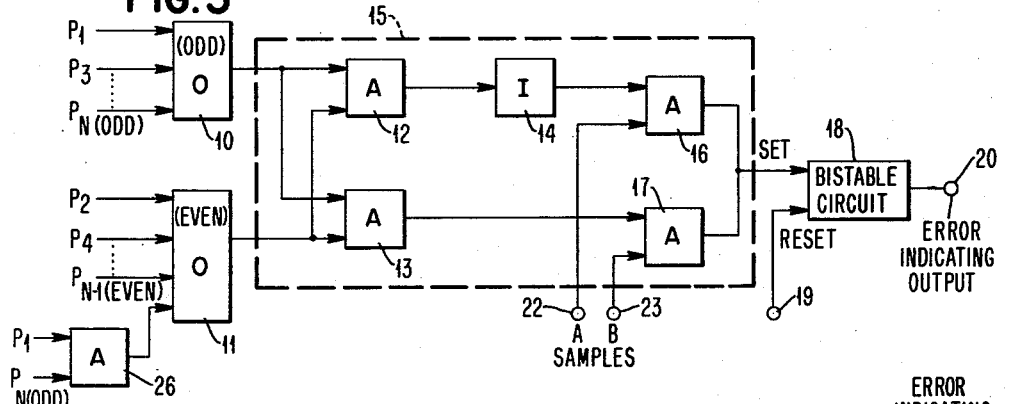
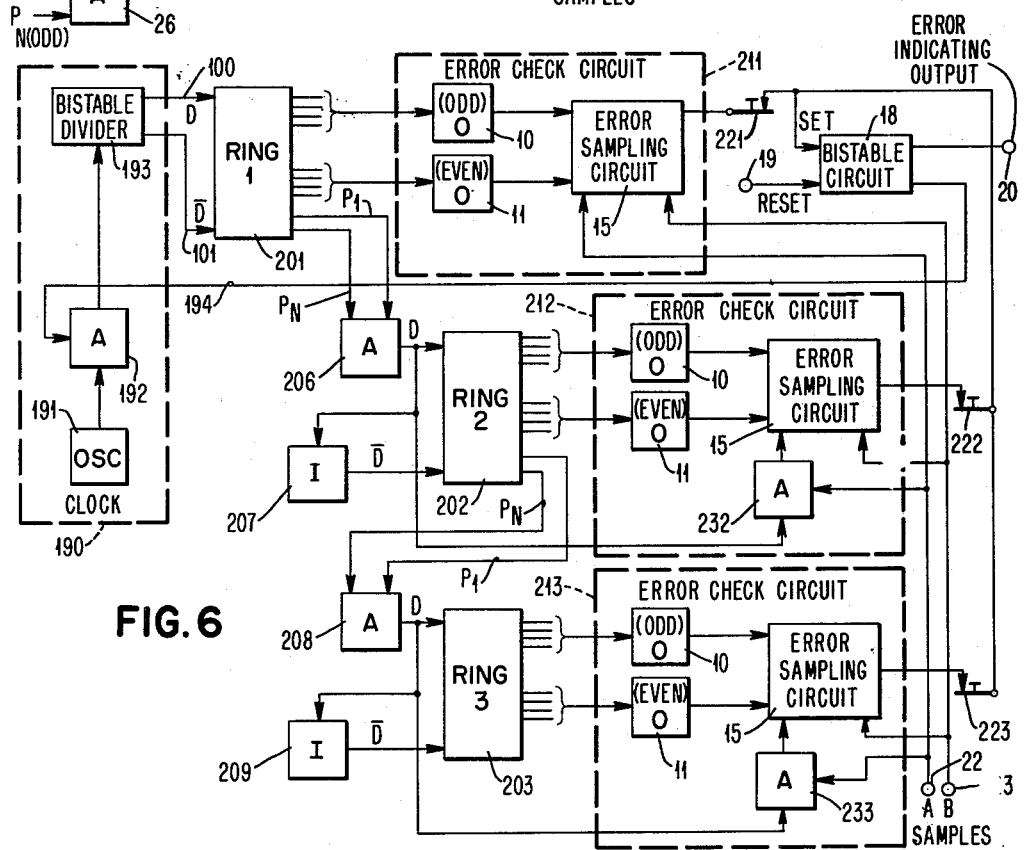

United States Patent Office 3,163,847
Patented Dec. 29, 1964

3,163,847
CHECK CIRCUIT FOR RINGS WITH
OVERLAPPING OUTPUTS
Leo T. O'Connor, Jr., Elbridge, N.Y., assignor to International Business Machines Corporation, New York, N.Y., a corporation of New York
Filed Jan. 3, 1961, Ser. No. 80,168
4 Claims. (Cl. 340—146.1)

This invention relates to a check circuit which monitors the operation of a ring circuit that has time overlapped outputs as it steps through its output sequence.

Time overlapping outputs are common to the operation of direct-coupled rings. It is necessary for a trigger in said ring to remain in a "set" condition during the time that a following trigger is "set" by a driving voltage level. Both triggers remain "set" during the existence of the driving level; and when it subsides, the initially "set" trigger is "reset" by a complementary voltage level.

The "reset" status of a trigger is defined as its normal status in this specification.

Prior U.S. patents providing ring checking circuits are No. 2,769,971 to C. J. Bashe and 2,724,104 to H. K. Wild, both assigned to the present assignee. The described circuit of Wild operates by measuring the time interval between selected outputs of a ring. If improper ring operation causes two outputs from the ring at any one time, the measured time interval is improper to indicate an error in ring circuit operation. The described circuit of Bashe provides a highly effective ring checking circuit for rings that have one and only one bistable device in a first stable state at any one time. Furthermore, the check circuit of Bashe increases in number of components as the number of stages in its associated ring is increased, by requiring an additional "AND" and "OR" circuit for each added stage in the associated ring circuit.

It is therefore an object of this invention to provide a monitoring circuit for a ring having adjacent bistable circuits operating with overlapping "set" states during normal operation of the ring circuit.

It is another object of this invention to provide a ring check circuit for direct-coupled rings.

It is still another object to provide a relatively simple ring check circuit.

It is a further object of this invention to provide a ring check circuit which does not substantially increase in complexity as the number of stages of a monitored ring are increased.

It is an object of this invention to provide a ring check circuit that is totally effective in determining open circuiting or short circuiting of critical components in a monitored ring circuit.

It is still another object of this invention to provide a ring circuit that is substantially effective in detecting operating errors within a monitored ring.

It is another object of the invention to provide a check circuit arrangement for a plurality of tandemly driven ring circuits to provide an overall increase in detectable operating errors over and above the effectiveness of any individual ring check operation.

It is still another object of this invention to provide a check circuit arrangement for a plurality of tandemly driven ring circuits, wherein certain operating errors of a ring, that are not detectable by the check circuit associated with a ring, are detectable by a following check circuit in the sequence.

This invention includes a first OR gate means which receives outputs from odd-numbered outputs of a monitored ring, and a second OR gate means which receives inputs from even-numbered outputs of the monitored ring. AND gate means receives outputs from both OR gate means to detect the overlapping and non-overlapping status for adjacent ring outputs. Two sets of sampling pulses are provided, one occurring when normal overlap should exist, and the other occurring when no normal overlap should exist. The overlapping and non-overlapping times are determined by the timing of the driving pulses to the associated ring circuit. A ring error is indicated when there is no overlap during a sampling pulse of the first set, that should find an overlap, or when there is overlap during a sampling pulse of the second set, that should not find an overlap.

The foregoing and other objects, features and advantages of the invention will be apparent from the following more particular description of preferred embodiments of the invention, as illustrated in the accompanying drawings.

Figure 3:
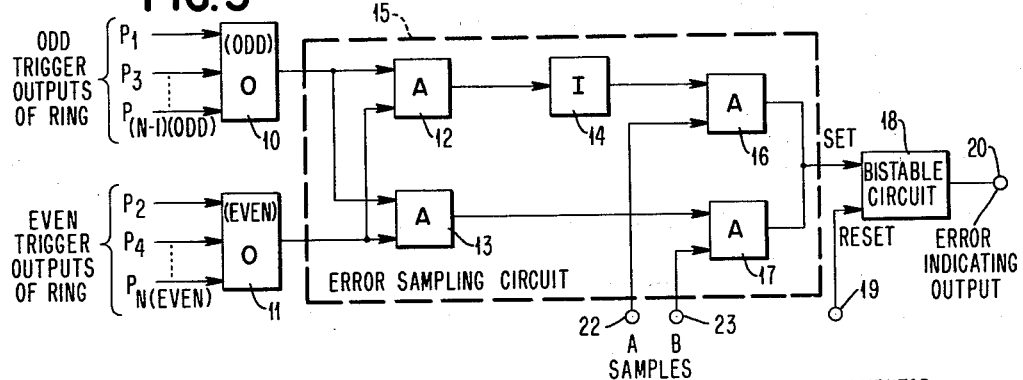

In the drawings:

FIGURE 1 illustrates a direct-coupled ring circuit which may be monitored by this invention but which is not considered part of this invention;

FIGURES 2A through F show waveforms used in explaining the operation of the ring circuit in FIGURE 1;

FIGURE 3 represents one embodiment of the invention;

FIGURES 4A, B and C show waveforms used in explaining the operation of the embodiment in FIGURE 3;

FIGURE 5 represents another embodiment of the invention; and,

FIGURE 6 provides still another form of this invention involving combinations of embodiments previously described.

Specific forms of circuitry are now considered. A type of ring circuit to which the present invention can be applied is shown in FIGURE 1. It illustrates a ring circuit designed to utilize direct-coupled semiconductor logic circuits. This ring includes a plurality of trigger circuits designated T–1 . . . T–N. Each trigger circuit provides a pair of complementary outputs P and $\bar{P}$, which have a sub-number designation corresponding to the number designation of its trigger circuit. The ring circuit outputs are provided by trigger outputs $P_1, P_2 \ldots P_N$.

A pair of AND gates A and A' are also associated with each trigger circuit, and each AND gate has a number designation corresponding to the number of its associated trigger. Each gate A has its output connected to a "set" input of its trigger; while each gate A' has its output connected to the "reset" input of its trigger circuit.

Figure 2:
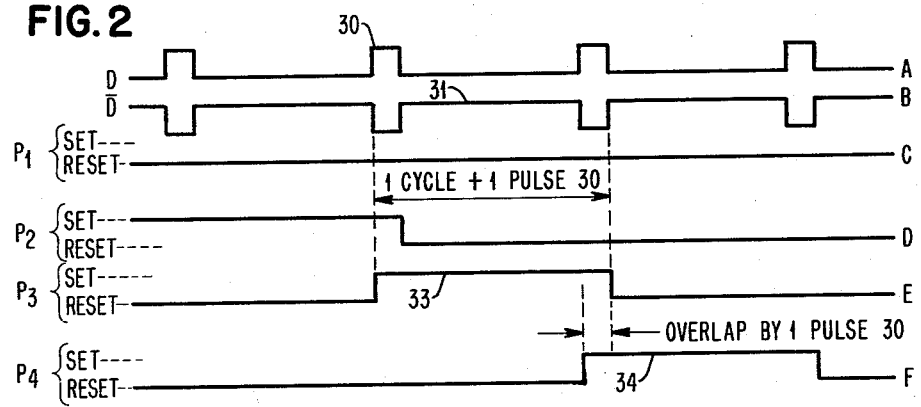

The ring is driven by complementary pulsed inputs D and D' provided on input leads 100 and 101, respectively. FIGURES 2A and B show pulse 30 as a D pulse and pulse 31 as a $\bar{D}$ pulse. Each D pulse advances the ring outputs by one step by setting another trigger in the sequence in FIGURE 1. Each complementary $\bar{D}$ pulse "resets" a respective trigger preceding a trigger "set" by the last D pulse in FIGURE 1.

The logic found in the ring of FIGURE 1 is that a trigger can be "set" by a D pulse when:

(1) its first prior adjacent trigger T is in a "set" condition, and
(2) its second prior adjacent trigger T is in a reset condition, and
(3) a drive pulse 30 occurs.

A trigger T can be "reset" by a $\bar{D}$ pulse when:

(1) its following adjacent trigger is "set," and
(2) a pulse 31 occurs.

The above "set" logic is obtained by each AND gate A, which has inputs connected to lead 100, to an output P of the preceding trigger, and to a complementary output $\bar{P}$ of the next preceding trigger. Furthermore, the above "reset" logic is obtained by gate A′, which has inputs connected to lead 101, and to output P of the following trigger.

Accordingly, the ring in FIGURE 1 permits a trigger to be "set" only after the preceding trigger is "set," and to be "reset" only after the following trigger is "set." Triggers can be "set" only during D-pulses 30 and can be "reset" only during $\overline{D}$-pulses 31 following a "setting" pulse 30.

There results an "output level" pulse which advances from one trigger output P to the next around the ring during a sequence of driving pulses. An overlapping "output level" between adjacent outputs P occurs during the overlapping "set" conditions of adjacent triggers existing for the period of each D-pulse 30. The advancement of outputs is illustrated in FIGURES 2E and F by pulses 33 and 34. Consequently, each output pulse, such as 33 or 34, has a duration corresponding to one cycle of wave D plus the duration of one pulse 30. Hence, there is an overlap for the duration of pulse 30 as the "set" status is transferred from one trigger to the next within the ring. That is, during each pulse 30, two adjacent trigger circuits T have "set" status.

Often ring circuits are used for critical purposes, such as to address a buffer storage unit. It becomes imperative that the ring operate precisely and without error under such circumstances. It then becomes essential to know immediately when such ring circuit stops functioning properly. This invention can be applied to a ring circuit of the type shown in FIGURE 1 to indicate when its operation becomes improper.

FIGURE 3 illustrates an embodiment of a circuit made according to the invention for use with rings having an even number of outputs. It includes an OR gate 10 which has inputs connected to odd-numbered trigger outputs $P_1$, $P_3$ ... $P_{(N-1)}$ of the ring of FIGURE 1. In a like manner, another OR gate 11 has inputs connected to even-numbered trigger outputs $P_2$, $P_4$ ... $P_N$ of the ring circuit of FIGURE 1.

A pair of AND gates 12 and 13 each have inputs connected to outputs of both OR gates 10 and 11. A second pair of AND gates 16 and 17 receive respective inputs, inverted and non-inverted outputs of AND gates 12 and 13. An inverter 14 is accordingly provided at the output of gate 12.

The logic of each AND gate 12, 13, 16, or 17 is that its respective output goes positive only when both of its inputs go positive. Often "AND" gate circuits have an inherent inversion of output, such as common-emitter circuits, and it will be obvious to one in the art how such gates are applicable to this embodiment of the invention.

A pair of terminals 22 and 23 are connected to sources of sampling pulses A and B, respectively, which are illustrated in FIGURES 4B and C. An A sample pulse 36 occurs during a drive pulse 30; and each B sample pulse 37 occurs between the drive pulses 30. Terminals 22 and 23 are connected to respective AND gates 16 and 17. Pulses A and B can be generated by many different means in the art, such as by differentiating and delaying the leading edges of pulses 30 and 31.

A bistable circuit 18 has a "set" input connected to both outputs of AND gates 16 and 17. A "reset" input of bistable 18 is connected to a terminal 19. An error indication is provided by a particular direct-current level at an output 20 of bistable circuit 18. That is, bistable circuit 18 will be "set" in response to an error occurring within the ring circuit, and the voltage level at terminal 20 will change to the "set" level.

Reset terminal 19 may obtain pulses from a manual or an automatic source which resets bistable 18 before operation by the ring circuit and after correction of a fault in the ring circuit.

The operation of the circuit in FIGURE 3 with a properly functioning ring circuit is: AND gates 12 and 13 are enabled during the normal overlapping "set" conditions of adjacent triggers found during each pulse 30. Accordingly the inverted output of gate 12 disarms gate 16 when it receives each A sample pulse; and no output results from gate 16. Similarly during proper ring operation, the output of AND gate 13 primes AND gate 17 during each pulse 30, but no B-sample pulse occurs then; and no output results from gate 16. During a B-sample pulse, gate 17 is disarmed by the normal output of gate 13, and no output results from gate 17.

Therefore, during proper operation of the ring circuit, each A-sample pulse finds AND gate 16 disarmed; and each B-sample pulse finds AND gate 17 disarmed. Consequently, neither sample pulse A nor B can pass through gates 16 or 17 to "set" bistable circuits 18 during proper operation of the ring.

However, if for some reason one or more of the ring triggers fails to "set" or to "reset" when its sequence comes up, the normal "set" overlap between adjacent outputs of the ring is changed by beign too long, or too short, or entirely absent. Then, AND gate 16 will not be disabled during an A pulse, or AND gate 17 will not be disabled during a B pulse; and an A or B pulse will pass to "set" bistable circuit 18 and indicate an error.

That is, if the overlap extends beyond the duration of the pulse 30, a B-pulse will pass through gate 17 to set bistable circuit 18 to indicate an error. And if the overlap is much less than the duration of pulses 30, or is absent, an A pulse will pass through gate 16 to "set" bistable 18. These two types of conditions occur whenever a critical component fails by short circuiting or open circuiting within the ring circuit.

The circuit of FIGURE 5 is designed for recirculating ring circuits which have an odd-number of trigger states. FIGURE 5 is basically the same as FIGURE 3, except that an AND gate 26 is added. Gate 26 receives inputs from the first and last trigger circuits of an odd-numbered ring; wherein these inputs are designated $P_1$ and $P_N$. The output of AND gate 26 is provided as an input to OR gate 11, and it appears to OR gate 11 like an even-numbered trigger output.

Accordingly, in FIGURE 5 the "set" overlap between T–1 and T–N(odd) provides an output from "OR" gate 11 simultaneously with an output from OR gate 10 caused by inputs $P_1$ or $P_{N(odd)}$. Accordingly AND gates 12 and 13 become enabled during the overlap of the first and last ring stages, in a similar manner to becoming enabled during other overlaps.

FIGURE 6 illustrates an arrangement wherein a plurality of ring circuits 201, 202 and 203 are tandemly driven; wherein each is driven in sequence from the preceding ring at a divided rate. Each ring 201, 202 or 203 may have any number of trigger stages, with there being a minimum of three stages in any one ring. Thus any ring may have an odd or even number of stages.

The rings are driven by a clock 190 which may comprise a common circuit such as an oscillator 191 driving a chain of bistable circuits 193, with the last bistable output providing the clock output. This clock can have its output state frozen by interruption of the oscillator pulses to the chain of bistable circuits using an AND gate 192. Gate 192 is normally enabled by an input 194 received from an output of bistable circuit 18 in FIGURE 6, so that oscillator pulses pass to the input of divider 193. However, if bistable 18 is ever "set," gate 192 is instantly disabled; and the output state of divider 193 remains at whichever state existed at that instant.

Complementary outputs 100 and 101 are provided from opposite outputs of the last bistable circuit in bistable dividers 193. Thus leads 100 and 101 provide pulses D and $\overline{D}$ to inputs of ring 201.

However, ring 202 is driven one output step per complete circulation cycle of the preceding ring. Drive pulses D for ring 202 are obtained from AND gate 206, which is only enabled during the time overlap of outputs $P_N$ and $P_1$ of first ring 201. An inverter 207 also receives the output of gate 206 to provide the $\overline{D}$ input to ring 202.

In a like manner, ring 203 is driven one step per sequencing cycle of ring 202, using an AND gate 208 and inverter 209. Gate 208 has respective inputs connected to outputs $P_1$ and $P_N$ of ring 202. Likewise, inverter receives an output of gate 208 to provide input $\overline{D}$ to ring 203.

Error check circuits 211, 212 and 213 are associated respectively with rings 201, 202 and 203. Each check circuit 211, 212 or 213 is of the type illustrated in FIGURE 3 or FIGURE 5 according to whether its associated ring circuit has an even or an odd number of stages.

Terminals 22 and 23 in FIGURE 6 likewise receive sampling pulses A and B, respectively, of the types shown in FIGURES 4B and C. Terminals 22 and 23 are connected directly to check circuit 211 in the manner described for the circuits in FIGURES 3 and 5, because its ring 201 is directly driven by D pulses 30 from clock 199.

However, the A sample pulses cannot be applied directly to error check circuits 212 and 213, because their associated rings are not driven by all D pulses 30 provided on input line 100. AND gates 232 and 233 are provided to select only those A pulses that correspond to an input drive pulse to the associated ring from gates 206 and 208, respectively. Thus, the outputs of gates 232 and 233 are provided as the input to gates 16 in respective check circuits 15. For like reasons, AND gate 232 has inputs connected to terminal 22 and to the output of gate 206; and AND gate 233 has inputs connected to terminal 22 and the output of gate 208.

Only a single bistable circuit 18 is needed in the arrangement of FIGURE 6. In this figure, the outputs of all error check circuits 211, 212 and 213 are connected in common through three normally-closed switches 221, 222 and 223 to the "set" input of bistable circuit 18. Accordingly, an error by any of rings 201, 202 or 203 is indicated by a change in level at output terminal 20.

Isolation of the error to one of ring circuits 201, 202 or 203 is obtained by driving the system with only one of switches 221, 222 or 223 closed at a time. When an error is indicated with a particular one of these switches closed, the error is then isolated to the ring associated with the closed switch, and corrective measures can then be taken.

It will be obvious to one in the art, after studying the present specification, that certain Boolean logic manipulations may be made within the circuits described, such as having only a single AND gate in place of gates 12 and 13 and inverter 14 and providing therefrom inverted and non-inverted outputs to respective AND gates 16 and 17.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A checking circuit for a direct-coupled ring of storage units, comprising first means for detecting output settings of alternate storage units, second means for detecting output settings of remaining storage units, gate means for determining simultaneous outputs of said first and second means, means for sampling an output of said gate means during a drive pulse to said ring, other means for sampling the output of said gate means between drive pulses to said ring, and means responsive to an output from either of said sampling means to indicate improper operation by said ring.

2. A checking circuit for a ring of storage units, comprising first OR gate means receiving outputs from odd-numbered storage units in said ring, second OR gate means receiving outputs from even-numbered storage units in said ring, AND gate means receiving outputs of said first and second OR gate means and providing inverted and non-inverted outputs, second and third AND gate means respectively receiving said inverted and non-inverted outputs as inputs, means for providing to said second AND gate means sampling pulses occurring during ring drive pulses to said ring, means for providing to said third AND gate means sampling pulses occurring between ring drive pulses, and means responsive to outputs from either said second or third AND gate means to indicate an error condition in said ring.

3. A circuit as defined in claim 2, wherein there are an odd number of storage units in said ring, comprising AND gate means receiving outputs from the first and last stages of said ring, an output of said last-mentioned AND gate means being provided as an input to said OR gate means connected to even-numbered storage units of said ring.

4. Monitoring means for a plurality of rings that are driven in tandem with respect to a source of drive pulses, wherein each of said rings can have any number of stages greater than two, a plurality of error checking circuits respectively associated with outputs of respective rings; each of said error checking circuits comprising: a first OR gate connected to even-numbered stages of its associated ring, a second OR gate connected to odd-numbered stages of its associated ring, AND gate means receiving outputs of said first and second OR gate means, sampling pulse means providing one set of pulses during driving pulses to a first of said tandem driven rings, and providing a second set of pulses between said driving pulses; comparator means in said checking circuit associated with said first ring being connected to said AND gate means and to said sampling means; and another AND gate means in each of the other checking circuits having an output connected to a comparator means of its checking circuit, and said another AND gate means having inputs received from said sampling pulse means and from the input to its associated ring.

References Cited in the file of this patent

UNITED STATES PATENTS

| | | |
|---|---|---|
| 2,685,683 | Holden et al. | Aug. 3, 1954 |
| 3,017,620 | Abzug | Jan. 16, 1962 |

OTHER REFERENCES

Arneth: "Counter Failure Detector," IBM Technical Disclosure Bulletin, vol. 2, No. 3, October 1959, page 88,